United States Patent Office 3,325,907
Patented June 20, 1967

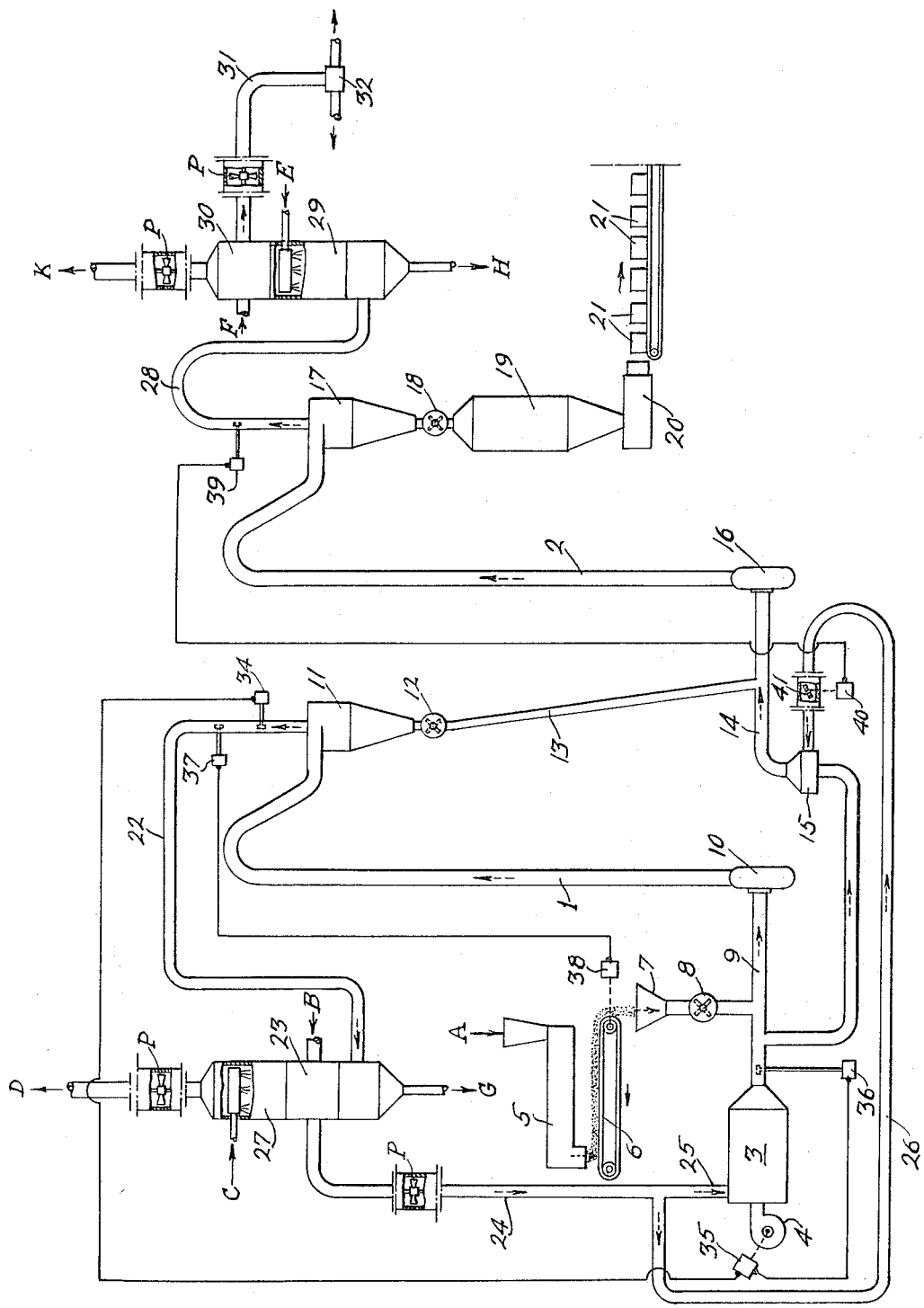

3,325,907
METHOD FOR HEAT RECOVERY IN PNEUMATIC DRYERS
Sven Wellmar, Bromma, and Bror Erik Löfgren, Stockholm, Sweden, assignors to Aktiebolaget Svenska Flaktfabriken, Stockholm, Sweden
Filed Mar. 1, 1965, Ser. No. 436,155
2 Claims. (Cl. 34—10)

ABSTRACT OF THE DISCLOSURE

Apparatus for drying particulate material having two dryer coils in which the particulate material is suspended in flowing gaseous drying medium, and a cyclone separator after each coil to separate the particulate material from the drying medium flowing therefrom. The separated drying mediums from the dryer coils are passed in a specified sequence through indirect heat exchangers for preheating the drying medium and air and also through direct heat-exchange water heaters which serve to wash the drying medium of the particles entrained therein, the heated particle-laden water from the washing heat exchangers being used in the manufacturing process in advance of the first dryer.

---

The present invention relates to so-called pneumatic dryers wherein the material to be dried is suspended in a flowing stream of gaseous drying medium, and has particular application to dryers for particulate material in which the material is suspended in a column of upflowing drying medium. Pneumatic dryers are often used for drying granular, powdered or fibrous materials, for example chopped grass, starch, cellulose fibres etc. These dryers are comparatively inexpensive to construct, and the heat economy is relatively good as long as the material can be dried at a high temperature without being damaged, but the economy is reduced rapidly when the drying temperature must be lowered in order to avoid any damage to the material. With the drying gas at a temperature of 850° C., approximately 850 to 900 kcal. must be used per kilo of evaporated water, and at a gas temperature of 150° to 200° C., approximately 1050 to 1100 kcal. must be used per kilo of evaporated water. These figures are applicable if the dryers are supplied with flue gases; if they are supplied with hot air heated indirectly, the heat consumption will be still higher, as the efficiency of the means for the heat generation seldom exceeds 80%. It is therefore desirable to improve the heat economy in some way.

In these dryers the drying medium and the material to be dried are in direct contact with each other—i.e. the material is suspended in the medium—and they must be separated from each other when the drying is completed. With the separation means now available, there are always certain losses of dry substance, which can be quite considerable depending on the nature of the material in the dried condition. Losses of 0.5 to 3% of the quantity of heated dried material often occur. These losses also cause secondary drawbacks in the form of dust spread in the vicinity of the plant. Usually the manufacturing processes prior to the drying of the product require large quantities of water for the treatment of material. It is desirable that the temperature of the processing water be kept as high as possible, since the viscosity of water decreases rapidly with rising temperature, and the material is to be dewatered, generally by filtration or pressing, as far as possible in advance of the drying. In dewatering, the uniformity of the water temperature is of great importance. If this temperature can be kept constant or nearly constant irrespective of the time of the year, the operation of the process will be greatly simplified, and it can then be conducted in a relatively simple manner with the minimum amount of manual work, in fact almost fully automatic. An end product with uniform moisture content and uniform quality then can be obtained, which is of the greatest importance in preventing the dried material from being attacked under storage, for instance by mold, from undergoing changes in colour, or from being damaged in some other way that could impair the end product.

All phases of the appropriate manufacturing processes represent an amount of heat consumption. A number of phases—for instance the drying—requires a supply of high-value primary heat. Others may be carried out with the aid of low-value (recovered) heat. The loss of heated dry material most often entails a loss that involves a high price when viewed with respect to heat consumption; if calculated per calorie, it will be higher than the cost of heat primarily supplied by the fuel. In order to attain optimum drying economy, some form or forms of heat recovery must be introduced into the process as far as possible, i.e. the primary quantity of heat supplied must be exploited more than once, and the heat losses in the form of high-value dry material must be avoided.

In brief the aim of the present invention is that the outgoing, damp, fibre-laden drying medium from the first dryer is first passed to a heat-exchanger, wherein it is caused to emit heat indirectly to preheat air used in the drying process and then is conveyed to a second heat exchanger, wherein the drying medium by direct contact is caused to emit heat directly to water which carries with it the fibres washed out of the drying medium. This water may be used in the processing of the material before it is introduced into the drying process. The drying medium leaving the second dryer is first caused to emit heat directly to water in which any dried material accompanying the drying medium is picked up, while the drying medium is passed to a heat exchanger, wherein the drying medium is caused to emit heat indirectly to air used for ventilation of the space or premises, wherein the manufacturing process is being carried out.

The invention will now be more closely described with reference to the accompanying drawing illustrating the schematic method according to the invention.

In the drawing two dryers included in the system are designated 1 and 2. A source of heat 3, here indicated as an oil-fired furnace, generates the quantity of primary heat required for drying. The burner of the furnace is marked 4. The material to be dried is introduced into the system at Point A, is dewatered by pressing and is broken down into particles suitable for a pneumatic drying plant. This takes place in the device 5, from which the material is carried by means of a conveyor 6, which can most suitably be of the type specified in Swedish Patent No. 115,553, to a feed inlet 7 and via a feeder 8 to a duct 9, which connects the source of heat with a fan 10, through which gas and material pass into the drying coil 1, and thence to a first cyclone 11, where the material is separated from the gas.

The separated material is fed via a rotary feeder 12, and a chute 13 into a duct 14, which is connected to the duct 9 at a point between the source of heat and the point of material in-feed and which has a mixing device 15 adapted to take in air for mixing with the gas from the furnace 3 in order to reduce the temperature of the gas before it enters the drying system 2. The gas-material mixture is forced by a fan 16 into the coil 2 and thence to a second cyclone 17, where gas and material are separated from each other. The finished dry material passes via a rotary feeder 18 to a container 19 and continues to a press 20, where it is pressed into bales 21, for dispatch to a place of consumption.

The very nearly saturated gas leaving the first cyclone 11 is conveyed through a duct 22 to a recovery unit, which consists of a heat exchanger 23 for indirect heat transfer from the gas to the air admitted at B and a hot-water heater 27. The heated air is conducted through ducts 24, 25 and 26, partly to the furnace 3 to be used as secondary and tertiary air and partly to the mixing device 15. Cold water admitted at C is heated first in the heater 27 and then in the heat exchanger 23. The heated water, which during the passage through 27 and 23 has washed out any fibres present in the gas, leaves the recovery system at G and is used for pulp preparation. The cooled exhaust gas leaves the system at point D.

The gas leaving the second cyclone 17 is conveyed through a duct 28 to a recovery system consisting of a hot-water heater 29 and a heat exchanger 30 of the same type as 23. Water is admitted to the hot-water heater at E, by means of which the gas is washed and relieved of fibres that are not collected in the cyclone. This fibre-laden water is drained off at H and, together with the water from G, is passed to the pulp preparation department. In this way fibre loss in the drying system can be eliminated and a quantity of heat is gained from the heated fibres and the exhaust gas that would otherwise have had to be taken from a primary source. After the gas has been washed in the heater it is passed through the heat exchanger 30, wherein it emits heat to air admitted at F. The heated air thus obtained is conveyed via a duct system 31 and distribution devices 32 into the space or premises wherein the manufacturing process is being carried out for ventilation purposes. In the drawing P denotes the several fans necessary for the operation of the heat exchangers.

The drying procedure must be controllable not only for the drying to take place in the desired manner but also with regard to the risk of overheating and ignition of the material to be dried. For this purpose a thermostat 34 is arranged in the duct line 22 from the first cyclone 11. This thermostat, which is pre-set at the lowset permissible temperature of the gas leaving the first dryer coil, actuates a motorized valve 35, which controls the supply of oil and air to the burner so that the supply to the furnace will increase if the gas temperature drops below the set value. However, the temperature of the gas exhausted from the furnace 3 must not exceed a maximum value to prevent drying damage and risk of ignition. A maximum thermostat 36 must therefor be arranged in duct 9 after the furnace to actuate the motorized valve 35 so that it cannot be open beyond a maximum value, even if thermostat 34 should demand more heat. Here it can happen that the quantity of material, and thus the quantity of water, introduced in the first drying coil is too large. By means of a special thermostat 37 and a servomotor 38 the rate of feed of device 6 is reduced so that the quantity of material fed in is reduced and balance will be restored. A thermostat 39 is arranged in discharge duct 28 to control the temperature in the drying coil 2. This thermostat actuates a motor 40, which adjusts a damper 41 in the inlet to the mixing device 15. The plant described can be modified in several different ways within the scope of the invention. For example, a furnace can be arranged for each drying coil and both be supplied with air from the heat exchanger 23. The infeed device and the actual drying coil can suitably be constructed in any conventional manner.

What we claim is:

1. In a manufacturing process for particulate material including the steps of processing the particulate material with water in a first stage, partially drying the processed material in a first dryer coil by suspending the material in a flowing drying medium, separating said partially dried material from the medium in a first cyclone separator following the first dryer coil, further drying the separated material from the first separator in a second dryer coil by suspending the material in a flowing drying medium, and separating the material from said drying medium in a second cyclone separator following the second dryer coil, particles of the material being entrained in each separated drying medium; the method of recovering heat including the steps of utilizing the particle-laden drying medium from the first separator first to preheat by indirect heat exchange the drying medium used in the dryer, and thereafter to heat by direct heat exchange water, said heated water washing the medium by picking up the particles from said particle-laden medium; and utilizing the particle-laden medium from the second separator first to heat by direct heat exchange water, said water washing the medium by picking up the particles from said medium, and thereafter utilizing the washed drying medium to heat by indirect heat exchange air for use in ventilating the space where the manufacturing process is being carried out.

2. A method according to claim 1 including the step of utilizing the heated particle-laden water from said two direct heat-exchange steps to process said fibrous material in said first stage.

References Cited

UNITED STATES PATENTS

| | | | |
|---|---|---|---|
| 486,806 | 11/1892 | Batcheller | 34—57 |
| 2,974,420 | 3/1961 | Kearton et al. | 34—10 |
| 3,256,614 | 6/1966 | Dunbar | 34—37 |

FREDERICK L. MATTESON, JR., *Primary Examiner.*

JOHN J. CAMBY, *Examiner.*